United States Patent
Liu et al.

(10) Patent No.: US 8,982,681 B1
(45) Date of Patent: Mar. 17, 2015

(54) METHOD AND DEVICE FOR INCREASED PULL-IN RANGE OF A TIMING RECOVERY CIRCUIT FOR STORAGE DEVICES

(71) Applicant: Marvell International Ltd., Hamilton (BM)

(72) Inventors: Jingfeng Liu, Longmont, CO (US); Mats Oberg, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/074,299

(22) Filed: Nov. 7, 2013

Related U.S. Application Data

(63) Continuation of application No. 11/775,119, filed on Jul. 9, 2007, now Pat. No. 8,582,409.

(60) Provisional application No. 60/830,630, filed on Jul. 13, 2006.

(51) Int. Cl.
| | | |
|---|---|---|
| *G11B 20/16* | (2006.01) | |
| *G11B 27/30* | (2006.01) | |
| *G11B 19/28* | (2006.01) | |

(52) U.S. Cl.
CPC ............ *G11B 27/3027* (2013.01); *G11B 19/28* (2013.01)
USPC ........................ 369/47.28; 369/53.34; 360/51

(58) Field of Classification Search
None
See application file for complete search history.

(56) References Cited

U.S. PATENT DOCUMENTS

| | | | |
|---|---|---|---|
| 5,533,003 A | 7/1996 | Kobayashi | |
| 7,466,782 B1 | 12/2008 | Patapoutian | |
| 2002/0150179 A1 | 10/2002 | Leis et al. | |
| 2006/0233286 A1 | 10/2006 | Annampedu et al. | |
| 2007/0081438 A1* | 4/2007 | Haddad et al. ............. | 369/59.25 |

OTHER PUBLICATIONS

Suzuki et al., "A Newly Developed Single-chip LSI for HD DVD/DVD/CD," IEEE Transactions on Consumer Electronics, vol. 52, No. 1, Feb. 2006.
ECMA-330 3$^{rd}$ Edition (Jun. 2005); 120 mm (4.7 Gbytes per side) and 80 mm (1.46 Gbytes per side) DVD Rewrittable Disk (DVD-RAM).

* cited by examiner

*Primary Examiner* — Wayne Young
*Assistant Examiner* — Brian Butcher

(57) ABSTRACT

A method and device for determining frequency error to extend the pull-in range of a timing recovery circuit for a storage device such as an optical disc drive. A code associated with a storage format of the storage device is detected, and the distance between occurrences of the code is determined. The calculated distance is compared with the expected distance to determine the difference. Based on the difference, the frequency error is determined.

18 Claims, 16 Drawing Sheets

METHOD AND DEVICE FOR INCREASED PULL-IN RANGE OF A TIMING RECOVERY CIRCUIT FOR STORAGE DEVICES

CROSS-REFERENCE TO RELATED APPLICATIONS

This application is a continuation of U.S. application Ser. No. 11/775,119, filed on Jul. 9, 2007, which claims priority under 35 U.S.C. §119(e) to U.S. Provisional Application No. 60/830,630, filed on Jul. 13, 2006. The disclosures of the applications referenced above are incorporated herein by reference in their entireties.

BACKGROUND OF THE INVENTION

1. Field of the Invention

The invention is directed generally to aiding frequency acquisition and, more particularly, to a method and device to extend the pull-in range of a timing recovery circuit for a storage device, such as an optical disc drive.

2. Related Art

Storage devices, such as disc drives and optical storage drives, use a spindle motor to rotate the storage disc. To ensure that information from the storage disc is obtained, it is necessary to know the rotational speed to correlate the data frequency of the storage disc.

One known method for obtaining the frequency includes moving a laser reading head to a hub of the storage disc and moving it back to a certain radius. Based on known radius and rotational speed, the data frequency can be estimated. However, this results in only an estimate of the frequency with an error of about 10%.

To account for this error, timing loop correction circuits have been employed to attempt to correct the error and pull-in the detected frequency so that the error is sufficiently small. However, known timing loop correction circuits may suffer from the problem with not being able to pull-in errors of relatively larger corrections. By way of example, a timing loop correction circuit may only be able to pull-in a frequency error of about 0.5%. If the frequency error is greater, the storage device may be unable to lock in the frequency and access the data. Accordingly, it would be desirable to provide improved frequency error pull-in for storage devices and, in particular, for optical storage drives.

SUMMARY OF THE INVENTION

The invention avoids the drawbacks and disadvantages of the prior art through a frequency detection scheme employing the known distances between codes used on the storage media, such as sync codes, wobble sync marks, headers for DVD-RAM, and similar repeating signals (collectively referred to herein as "sync codes"). In particular, as described herein, the frequency detector of the invention compares an actual distance between sync code occurrences and an expected distance between sync code occurrences to determine the frequency error, which is then used to control the motor that rotates the media.

The invention may be implemented in a number of ways. According to one aspect of the invention a timing recovery circuit for a storage device having rotating storage media includes a frequency detector to detect a frequency offset based on a code associated with the storage media and generate an output, and a timing control circuit responsive to the output of the frequency detector that controls a clock generator to generate a clock that may be in synchronization with a signal read from the storage media.

The frequency detector may be programmable based upon a format of the code associated with the storage media. The frequency detector further may include a code detector responsive to an input signal based upon the frequency of the code, a counter responsive to an output of the code detector to output a code distance count, and a frequency error generator responsive to the output of the counter to generate a frequency error signal. The frequency error generator further may include a summer subtracting an expected code distance count from the code distance count to generate a code distance count difference, and a multiplier to generate a normalized sync code distance count difference. The multiplier may divide the code distance count difference by the expected code distance count and the normalized sync code difference may be the frequency error. The frequency error generator further may include a comparator to compare the normalized sync code distance count difference with a threshold value and generate an output, and a multiplexer responsive to the output of the comparator to transmit the normalized sync code distance count difference to a timing loop. The frequency error generator further may include a comparator to compare the sync code distance count difference with a threshold value and generate an output, and a multiplexer responsive to the output of the comparator to transmit a normalized sync code distance count difference to the timing loop. The threshold value may be programmable. The circuit may include an absolute value module receiving the normalized sync code distance count difference and generating an absolute value of the normalized sync code distance count difference. The code distance count difference may be the number of clock cycles between the occurrences of the code. The expected code distance count may be programmable. The counter further may include a clock counter responsive to the frequency detection of a code event, the clock counter outputting a signal indicative of the number of clock cycles between the occurrences of the code events, and a comparator operatively connected to the clock counter to receive the signal from the clock counter, the comparator may compare the signal from the clock counter to a threshold and outputting a comparator signal based on the comparison. The circuit may include a first scaler responsive to the frequency detector to scale the output of the frequency detector by a frequency control gain. The circuit may include a timing loop that includes an accumulator responsive to the first scaler. The circuit may include a motor detector that may include a phase detector, and the timing loop further may include second and third scalers responsive to the phase detector to scale an output of the phase detector by a phase update gain and a frequency update gain, respectively. The circuit may include a summer responsive to one of the second and third scalers and the accumulator to generate the frequency acquisition signal. The code associated with the storage media may include a code selected from the group consisting of sync codes, wobble sync marks and headers. The clock generator may include a VCO.

According to another aspect a timing recovery method for a storage device having rotating storage media includes the steps of detecting a frequency offset based on a code associated with the storage media and generating an output, and controlling timing responsive to the frequency offset to generate a clock that may be in synchronization with a signal read from the storage media.

The method may include the step of programming the frequency detection based upon a format of the code associated with the storage media. The frequency detecting step further may include detecting a code responsive to an input signal based upon the frequency of the code, outputting a code distance count, and generating a frequency error signal. The step of generating a frequency error signal may include the steps of subtracting an expected code distance count from the code distance count to generate a code distance count difference, and generating a normalized sync code distance count difference. The step of generating further may include dividing the code distance count difference by the expected code distance count and wherein the normalized sync code difference may be the frequency error. The step of generating further may include comparing the normalized sync code distance count difference with a threshold value and generating an output, and transmitting the normalized sync code distance count difference to a timing loop. The step of generating may further include comparing the sync code distance count difference with a threshold value and generating an output, and transmitting a normalized sync code distance count difference to the timing loop. The method may include the step of programming the threshold value. The method may include the step of receiving the normalized sync code distance count difference and generating an absolute value of the normalized sync code distance count difference. The code distance count difference may be the number of clock cycles between the occurrences of the code. The method may include the step of programming the expected code distance count. The method may include the step of scaling the output by a frequency control gain. The code associated with the storage media may include a code selected from the group consisting of sync codes, wobble sync marks and headers.

In yet another aspect of the invention a timing recovery circuit for a storage device having rotating storage media that includes means for detecting a frequency offset based on a code associated with the storage media and generating an output, and means for controlling timing responsive to the frequency offset to generate a clock that is in synchronization with a signal read from the storage media.

The frequency detecting means may be programmable based upon a format of the code associated with the storage media. The frequency detecting means further may include means for detecting a code responsive to an input signal based upon the frequency of the code, means for outputting a code distance count, and means for generating a frequency error signal. The generating means may further include means for subtracting an expected code distance count from the code distance count to generate a code distance count difference, and means for multiplying to generate a normalized sync code distance count difference. The multiplying means further may include means for dividing the code distance count difference by the expected code distance count and wherein the normalized sync code difference may be the frequency error. The generating means further may include means for comparing the normalized sync code distance count difference with a threshold value and for generating an output, and means for multiplexing responsive to the output of the comparing means to transmit the normalized sync code distance count difference to the timing loop. The generating means further may include means for comparing the sync code distance count difference with a threshold value and generate an output, and means for multiplexing responsive to the output of the comparing means to transmit a normalized sync code distance count difference to the timing loop. The threshold value may be programmable. The circuit may include means for generating an absolute value receiving the normalized sync code distance count difference and generating an absolute value of the normalized sync code distance count difference. The code distance count difference may be the number of clock cycles between the occurrences of the code. The expected code distance count may be programmable. The outputting means further may include means for clock counting responsive to the frequency detection of a code event, the clock counting means outputting a signal indicative of the number of clock cycles between the occurrences of the code events, and means for comparing operatively connected to the clock counting means to receive the signal from the clock counting means, the comparing means comparing the signal from the clock counting means to a threshold and outputting a signal based on the comparison. The circuit may include a first scaler responsive to the frequency detecting means to scale the output of the frequency detecting means by a frequency control gain. The circuit may include a timing loop that includes means for accumulating responsive to the first scaler. The circuit may include means for detecting a motor comprising a phase detector and the timing loop further may include second and third scalers responsive to the phase detector to scale an output of the phase detector by a phase update gain and a frequency update gain, respectively. The circuit may include a summer responsive to one of the second and third scalers and the accumulator to generate the frequency acquisition signal. The code associated with the storage media may include a code selected from the group consisting of sync codes, wobble sync marks and headers. The clock generator may include a VCO.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION OF THE INVENTION

Figure 1:
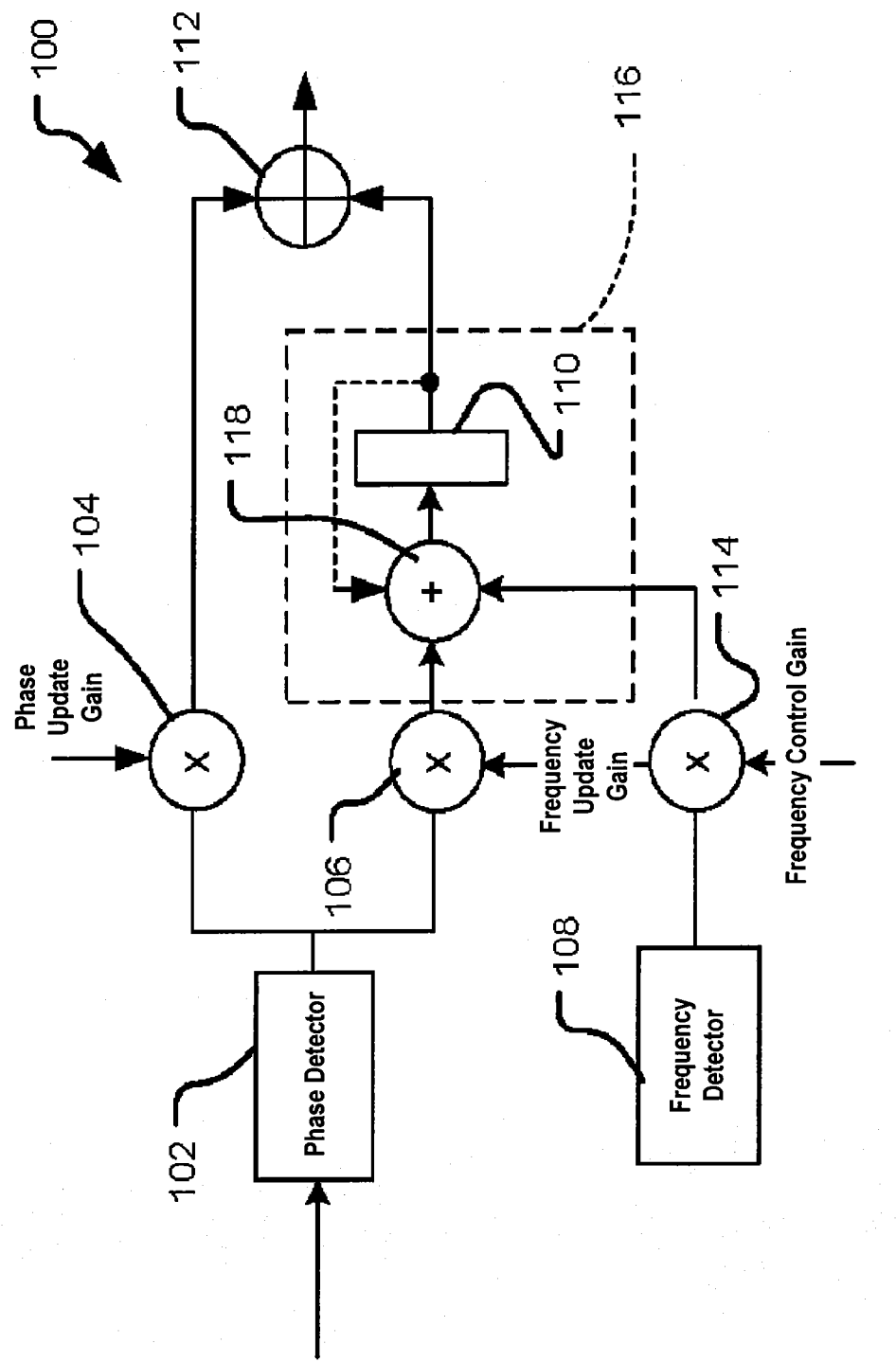
FIG. 1 shows an exemplary embodiment of a timing loop circuit having a frequency detector constructed according to the principles of the invention.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

According to principles of the invention, a frequency detector scheme is employed to aid in a frequency acquisition circuit for storage devices such as optical storage, but a skilled artisan will appreciate that the principles of the invention may be employed in other storage devices having storage media rotating at high frequencies and similar devices. This implementation may significantly extend the pull-in range of the timing recovery loop. Storage discs have different storage formats that include various types of periodic repeating signals, such as the sync codes referred to above. Depending on the format of the storage disc and different operational modes, the frequency detector can use the known distance between sync codes associated with the storage disc formats to detect errors. The frequency offset can then be estimated using the known distance between the detected sync codes. The estimated frequency offset can be multiplied by a gain factor and added to a frequency accumulator of the timing recovery loop to control the frequency of the channel lock and hence keep synchronized with the frequency of the RF signal. The principles of the invention are described in greater detail with respect to the exemplary embodiments described below.

FIG. 1 shows an exemplary embodiment of a timing loop circuit 100 having a frequency detector 108 constructed according to the principles of the invention. The timing loop circuit 100 is a feedback circuit that controls the generation of the channel clock based upon the detected error in frequency. The timing loop circuit 100 includes a phase detector 102, frequency detector 108, frequency accumulator 116 and a clock generator, e.g. a voltage controlled oscillator (VCO) (which is not shown here), as further described below.

The phase detector 102 detects the phase of the received signal and outputs a timing error signal that is branched over two lines. In the first branch, the timing error signal may be scaled with a phase update gain at a combiner 104, which may be a multiplier circuit that multiplies the signal by the phase update gain. In the second branch, the phase detector output signal may be scaled by a frequency update gain at combiner 106, which also may be a multiplier circuit.

The frequency detector 108 aids in frequency acquisition in the timing loop circuit 100. The output of the frequency detector 108 may be scaled by a frequency control gain using a combiner 114, such as a multiplier circuit, and combined with the output of combiner 106 in the timing loop circuit 100 by combiner 118, such as a summing circuit. The use of frequency detector 108 in the timing loop circuit 100 can extend the pull-in range of the timing loop. More specifically, the output from combiner 114 is combined with the output of combiner 106 in frequency accumulator 116. The frequency accumulator 116 includes the combiner 118 and delay component 110. The output of combiner 118 is delayed by delay component 110. The output of the delay component 110 is fed back into combiner 118. The output from the frequency accumulator 116 is combined with the output from combiner 104 at another combiner 112, such as a summing circuit. The output of combiner 112 is then sent to a VCO, or other means for clock generation, to generate the clock controlling the ADC.

Figure 2:
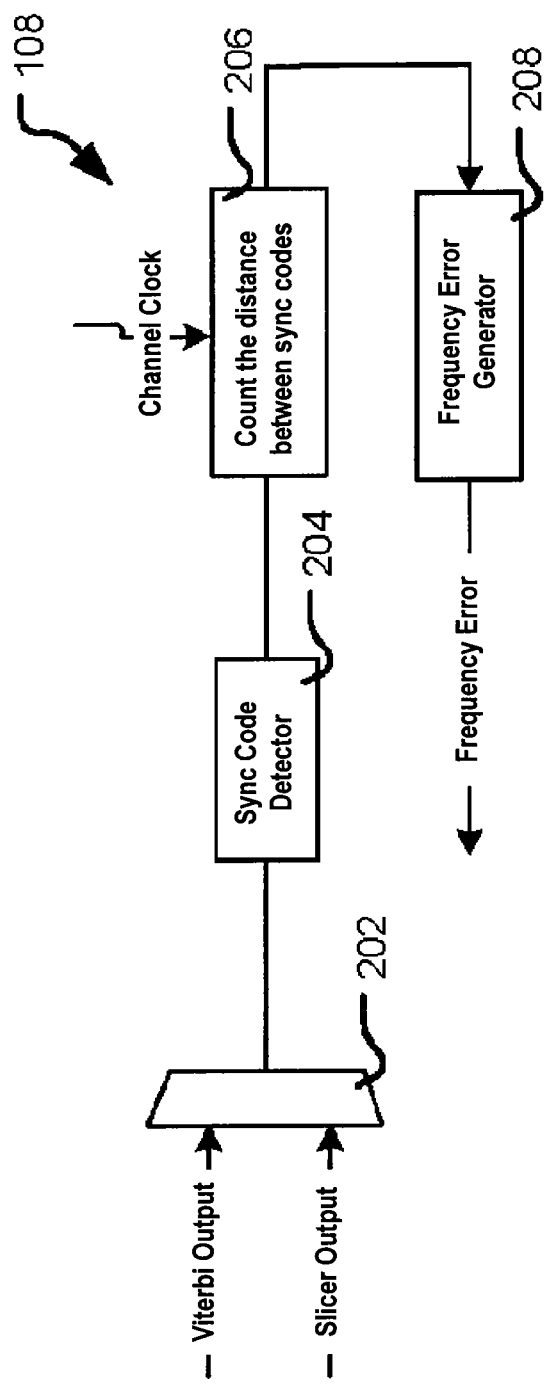
FIG. 2 shows an exemplary frequency detector constructed according to the principles of the invention, which may be used in connection with the timing loop circuit shown in FIG. 1.

FIG. 2 shows an exemplary frequency detector constructed according to the principles of the invention, which may be used in connection with the timing loop shown in FIG. 1. In particular FIG. 2 shows one embodiment of the sync code distance based frequency detector 108 of the invention. The frequency detector 108 may include a multiplexer 202, a sync code detector 204, a counter 206 and a frequency error generator 208. The sync codes on the storage media may be detected using one or more detectors, such as a Viterbi detector and/or a slicer detector and/or a decision feedback equalizer and/or a correlation detector, which are coupled to the read head of a storage drive, as is known in the art. The output from the Viterbi and/or slicer detectors is received at a multiplexer 202. A VIT_OR_SLICER controls which signal to use. For the slicer output, a limit equalizer (not shown) positioned before the slicer may be used to equalize the signal.

The sync code detector 204 is responsive to the output of the multiplexer 202. The sync code detector 204 may be a match finder that detects a signal output from the multiplexer 202 and determines when a match for a specific sync code occurs. According to an embodiment of the invention, the sync code detector 204 may be programmable to permit the detection of different types of sync codes. Different storage formats, such as CD, DVD, Blu-ray or HD DVD, use different types of sync codes and different distances between the sync codes. Therefore, the sync code detector 204 may be programmable to allow the frequency detector 108 to be used with different storage devices.

The counter 206 is responsive to the output from sync code detector 204. The output from sync code detector 204 indicates whether a sync code occurrence has been detected. Using a channel clock signal, the counter 206 determines the distance between the detected sync codes. This distance may be expressed by the number of clock cycles between occurrences of the sync codes or the like, as a skilled artisan would appreciate. A frequency offset may be estimated from the distance between the detected sync codes by the frequency error generator 208. As described above, the estimated frequency offset can be multiplied with the frequency control gain by combiner 114 and the result is then provided to the frequency accumulator 116.

Thus, the frequency error generator 208 receives the output from counter 206, and generates a frequency offset, which is input to combiner 114.

Figure 2A:
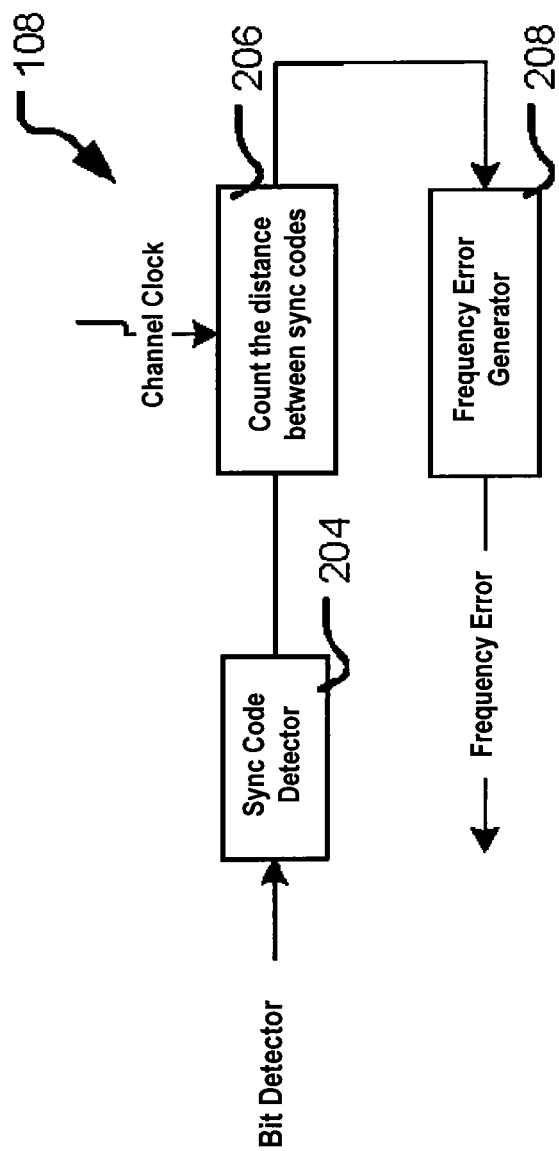
FIG. 2A shows another exemplary frequency detector constructed according to the principles of the invention, which may be used in connection with the timing loop circuit shown in FIG. 1.

FIG. 2A shows another exemplary frequency detector constructed according to the principles of the invention, which may be used in connection with the timing loop circuit shown in FIG. 1. More specifically, in the FIG. 2A aspect, the sync codes on the storage media may be detected using a bit detector, such as a Viterbi detector and/or a slicer detector and/or a decision feedback equalizer and/or a correlation detector, which are coupled to the read head of the storage drive, as is known in the art.

Figure 2B:
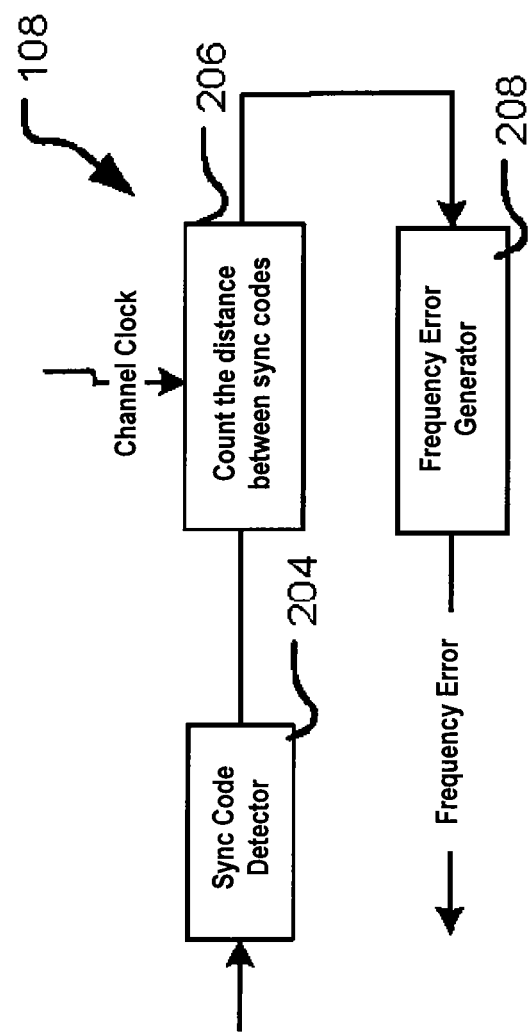
FIG. 2B shows yet another exemplary frequency detector constructed according to the principles of the invention, which may be used in connection with the timing loop circuit shown in FIG. 1.
Figure 3:
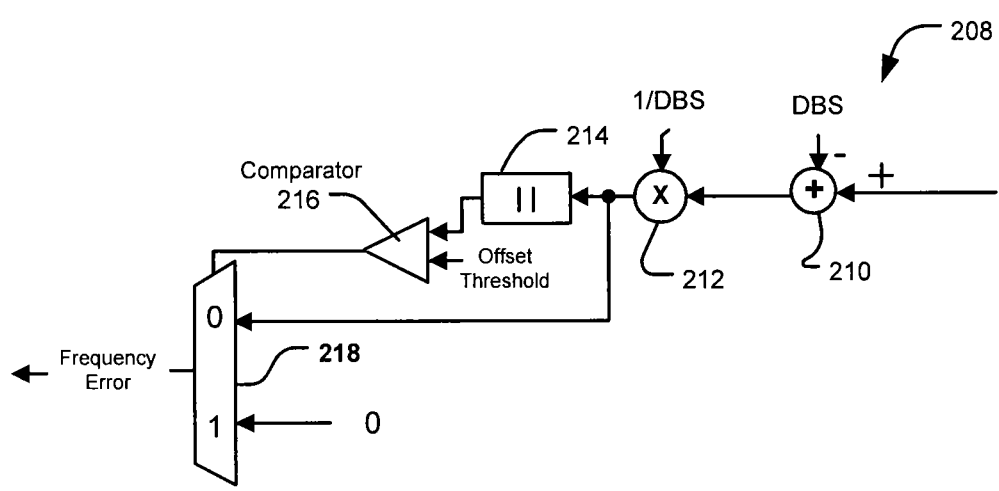
FIG. 3 shows an exemplary frequency error generator constructed according to the principles of the invention, which may be used in the frequency detector of FIG. 2.

FIG. 2B shows yet another exemplary frequency detector constructed according to the principles of the invention, which may be used in connection with the timing loop circuit shown in FIG. 1. In this aspect, the sync codes on the storage media may be detected using a sync detector such as a correlation or matched filter detector. The frequency error generator 208 will now be described in greater detail below in connection with FIG. 3.

The frequency error generator 208 is responsive to the output of counter 206. The output of the frequency error generator 208 is a function of the detected distance between sync codes and the expected distance, in for example clock cycles, between the known occurrences of the sync codes. As described above, different storage formats may have different sync codes, and different distances between the occurrences of the sync codes. The expected distance between sync codes may be programmable, so that the system of the invention may be used with various types of storage formats. The detected and expected distances are combined in the frequency error generator 208. The expected distance between the sync codes may be received by a combiner 210, such as a summer circuit. Combiner 210 subtracts the expected distance (DBS) from the detected distance from counter 206 between the sync codes.

To normalize the difference between the expected distance and the detected distance, and account for the normal distances between the sync codes, the output of combiner 210 is input to combiner 212, such as a multiplier circuit. Combiner 212 multiples the output of combiner 210 by the inverse of the expected distance (1/DBS), or an estimate thereof between the sync codes.

The output of combiner 212 may be input into an absolute value module 214, which converts the signal into an absolute value signal. This absolute value signal may be compared with an offset threshold by a comparator 216. A comparison with the offset threshold may ensure that no clearly erroneous detection signals are used in frequency acquisition. By way of example, an offset threshold may be set so that detected offset amounts in the signal of greater than 50% are ignored. Other threshold values may also be used. The threshold offset may be changed, thereby allowing the system of the invention to be used with various storage formats.

The output of the comparator 216 controls the output of a multiplexer 218. The inputs to the multiplexer 218 are zero (0) and the output of combiner 212. When the absolute value of the output of the combiner 212 is greater than the offset threshold, the multiplexer 218 outputs zero for the frequency offset. When the absolute value of the output of combiner 212 is less than the offset threshold, the multiplexer 218 outputs the value of the output of combiner 212 as the frequency offset.

Figure 3A:
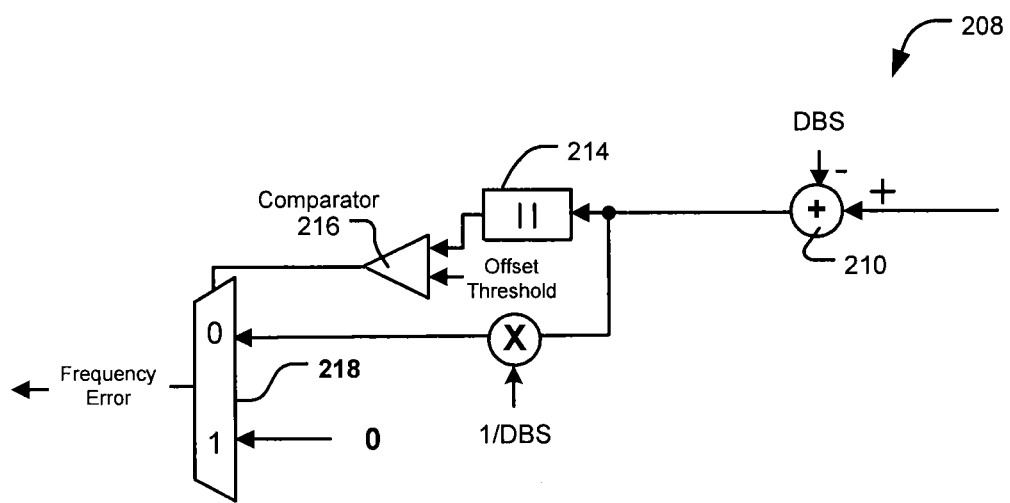
FIG. 3A shows another exemplary frequency error generator constructed according to the principles of the invention, which may be used in the frequency detector of FIG. 2.

FIG. 3A shows another exemplary frequency error generator constructed according to the principles of the invention, which may be used in the frequency detector of FIG. 2. In this aspect, the output of combiner circuit 210 may also be input into an absolute value module 214, which converts the signal into an absolute value signal. This absolute value signal may be compared with an offset threshold by a comparator 216. A comparison with an offset threshold may ensure that no clearly erroneous detection signals are used in frequency acquisition. By way of example, an offset threshold may be set so that detected offset amounts of greater than 50% are ignored. Other threshold values may also be used. The offset amount may be changed, thereby allowing the system of the invention to be used with various storage formats.

Figure 4:
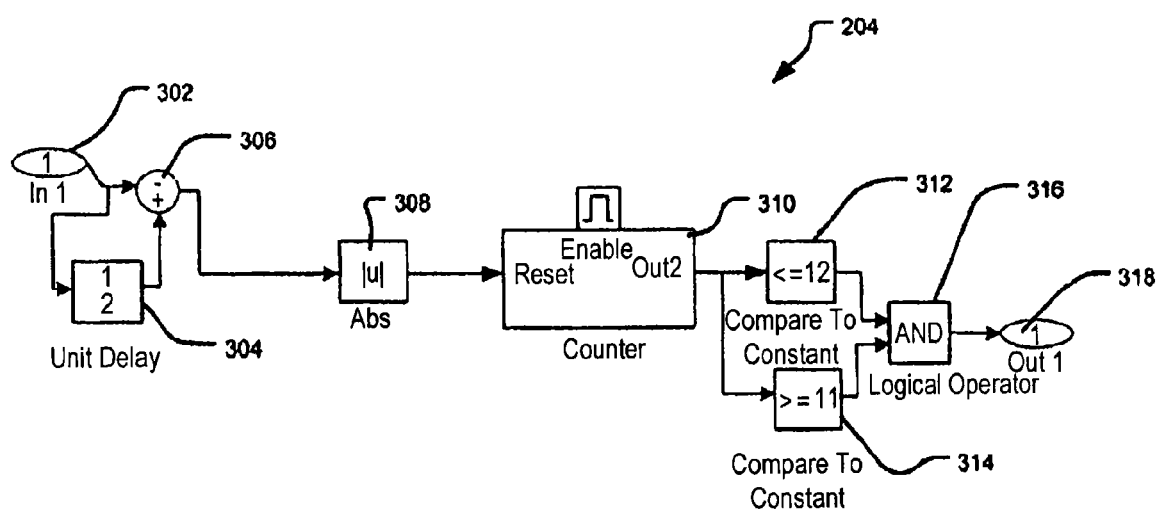
FIG. 4 shows an exemplary sync code detector constructed according to the principles of the invention, which may be used in the frequency detector shown in FIG. 2.

FIG. 4 shows an exemplary structure for a sync code detector 204 constructed according to the principles of the invention, which may be used in the frequency detector shown in FIG. 2. The input 302 to the sync code detector 204 is responsive to sync codes detected at the multiplexer 202. The input signal may be sent through a delay 304, and subtracted from the (non-delayed) input signal at a combiner 306, such as an adding circuit. The output of combiner 306 may be sent to an absolute value module 308, which outputs the absolute value of the signal received from combiner 306.

A counter 310 receives the signal from the absolute value module 308. The counter 310 is enabled by the occurrence of a sync code, and counts the number of clock cycles between each occurrence of the sync code received in the sync code detector 204.

The output of counter 310 may be input into comparators 312 and 314. Each of comparators 312 and 314 has a threshold amount based on the storage format. In the example illustrated in FIG. 4, comparator 312 is set at less than or equal to twelve (12), while comparator 314 is set at greater than or equal to eleven (11). Thus, the comparator 312 outputs a high signal when it receives a signal less than or equal to twelve (12), and comparator 312 outputs a low signal when it receives a signal greater than twelve (12). The comparator 314 outputs a high signal if it receives a signal greater than or equal to eleven (11), and comparator 314 outputs a low signal if it receives a signal less than eleven (11). Comparators 312 and 314 are programmable to allow various storage formats to be used. By way of example, for high definition (HD) DVD storage the nominal comparison range is [11, 12]. For DVD storage, the comparison range is [13, 15]. Other ranges may also be used.

The output of comparators 312 and 314 may be received at an AND gate 316. The signal from the AND gate 316 is output to output 318.

Figure 5:
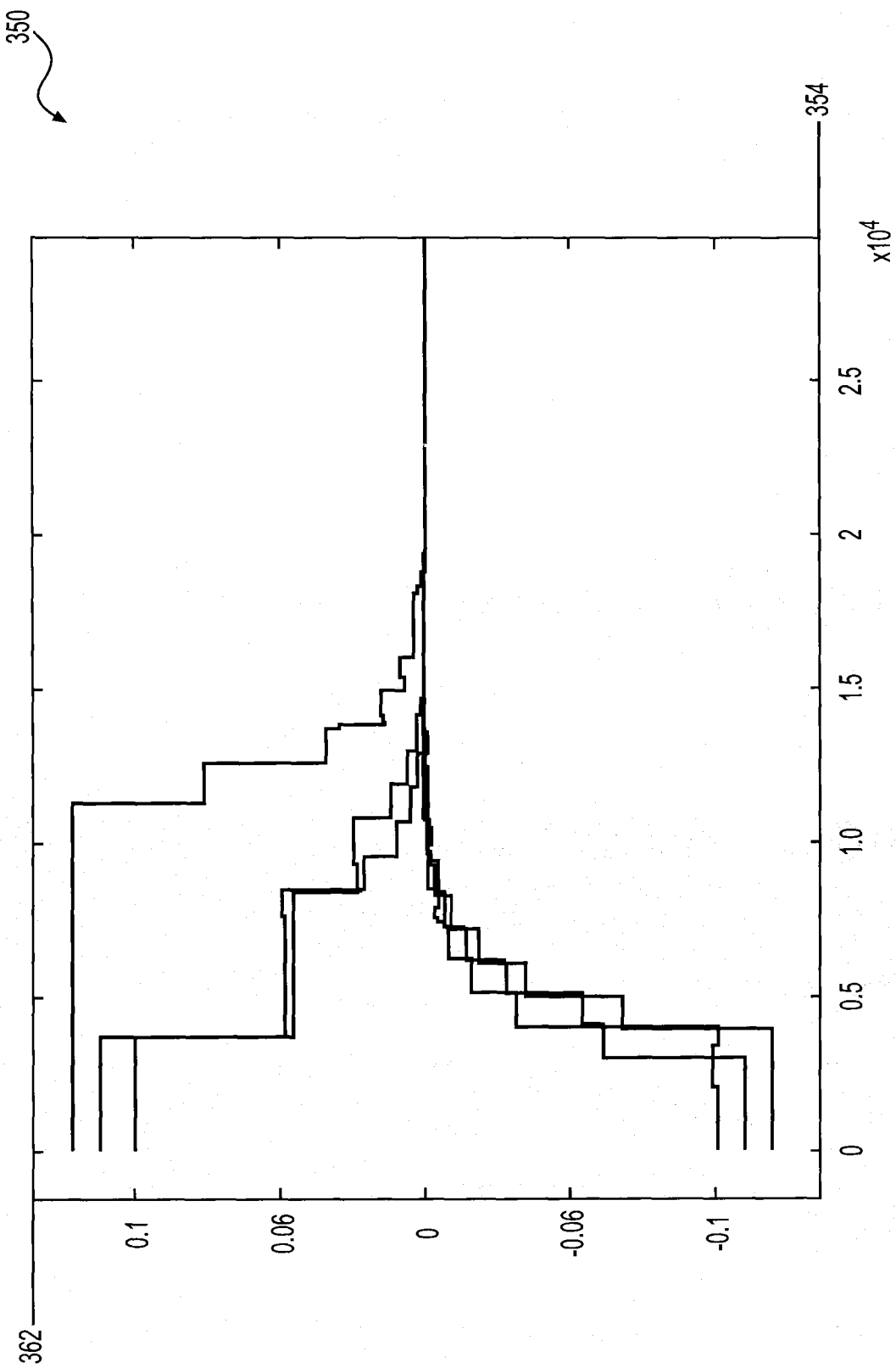
FIG. 5 shows a plot of simulated frequency trajectories resulting from principles of the invention.

FIG. 5 shows simulated frequency trajectories resulting from use of a timing recovery circuit constructed according to the principles of the invention. The graph illustrates a frequency error percentage 362, on the vertical axis, compared to time 354, on the horizontal axis. The simulation was performed using a captured HD waveform with added noise. The noise level is added such that the Viterbi Bit Error Rate (BER) is in the order of 1e-3. As illustrated, the frequency error percentage decreases over time to zero, at which point there is no error in the detected frequency. FIG. 5 shows a pull-in range of at least 12%. Other pull-in ranges may also be obtained.

Figure 6:
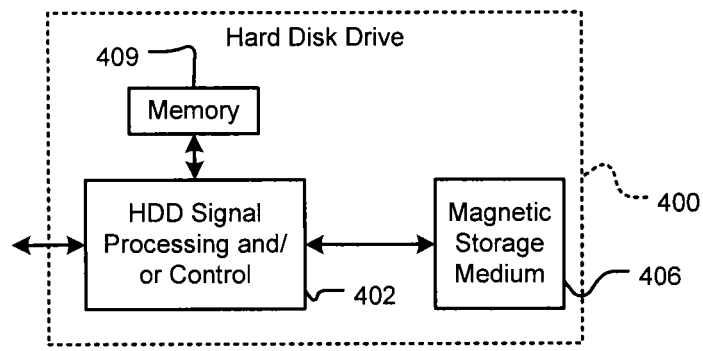
FIGS. 6-13 show various exemplary implementations of the invention.

Referring now to FIGS. 6-13, various exemplary implementations of the invention are shown. Referring to FIG. 6, the invention may be embodied in a hard disk drive 400. The invention may implement either or both signal processing and/or control circuits, which are generally identified in FIG. 6 at 402. In some implementations, signal processing and/or control circuit 402 and/or other circuits (not shown) in HDD 400 may process data, perform coding and/or encryption, perform calculations, and/or format data that is output to and/or received from a magnetic storage medium 406.

HDD 400 may communicate with a host device (not shown) such as a computer, mobile computing devices such as personal digital assistants, cellular phones, media or MP3 players and the like, and/or other devices via one or more wired or wireless communication links 408. HDD 400 may be connected to memory 409, such as random access memory (RAM), a low latency nonvolatile memory such as flash memory, read only memory (ROM) and/or other suitable electronic data storage.

Figure 7:
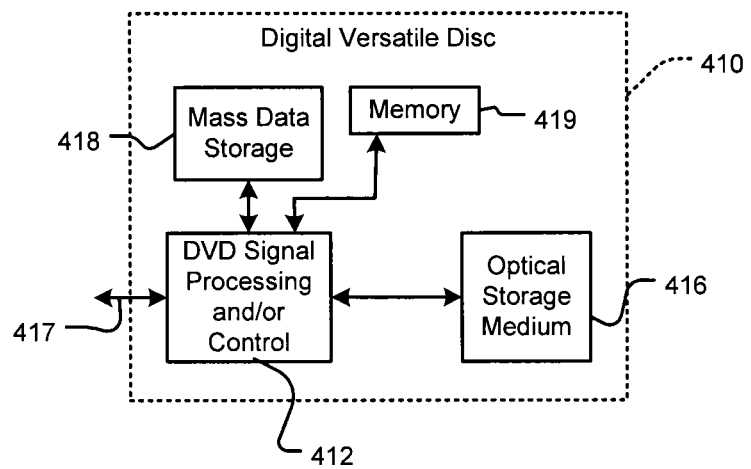

Referring now to FIG. 7, the invention may be embodied in a digital versatile disc (DVD) drive 410. The invention may implement either or both signal processing and/or control circuits, which are generally identified in FIG. 9B at 412, and/or mass data storage 418 of DVD drive 410. Signal processing and/or control circuit 412 and/or other circuits (not shown) in DVD drive 410 may process data, perform coding and/or encryption, perform calculations, and/or format data that is read from and/or data written to an optical storage medium 416. In some implementations, signal processing and/or control circuit 412 and/or other circuits (not shown) in DVD drive 410 can also perform other functions such as encoding and/or decoding and/or any other signal processing functions associated with a DVD drive.

DVD drive 410 may communicate with an output device (not shown) such as a computer, television or other device via one or more wired or wireless communication links 417. DVD drive 410 may communicate with mass data storage 418 that stores data in a nonvolatile manner. Mass data storage 418 may include a hard disk drive (HDD) such as that shown in FIG. 6. The HDD may be a mini HDD that includes one or more platters having a diameter that is smaller than approximately 1.8". DVD drive 410 may be connected to memory 419, such as RAM, ROM, low latency nonvolatile memory such as flash memory, and/or other suitable electronic data storage.

Figure 8:
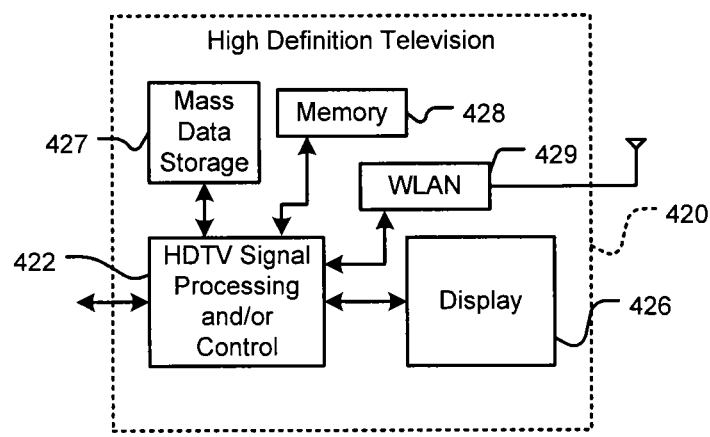

Referring now to FIG. 8, the invention may be embodied in a high definition television (HDTV) 420. The invention may implement either or both signal processing and/or control circuits, which are generally identified in FIG. 5C at 422, a WLAN interface and/or mass data storage of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in FIG. 6 and/or at least one DVD may have the configuration shown in FIG. 7. The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429.

Figure 9:
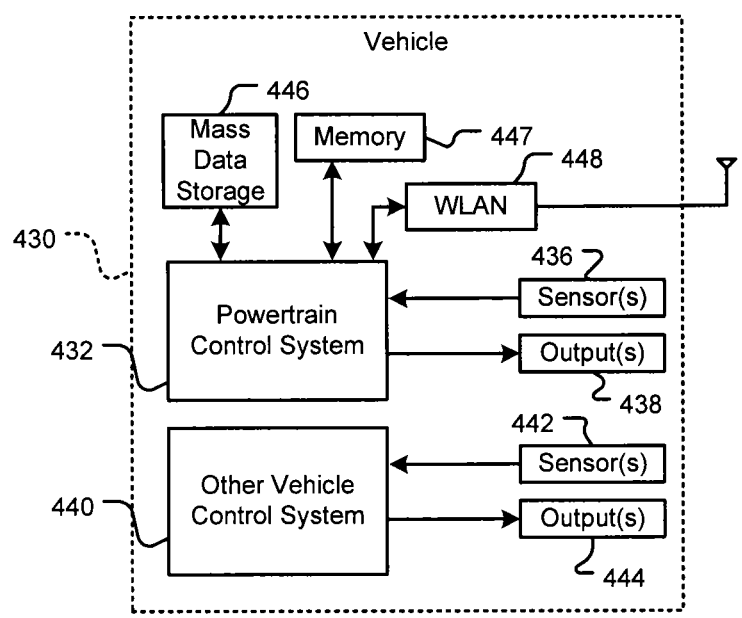

Referring now to FIG. 9, the invention implements a control system of a vehicle 430, a WLAN interface and/or mass data storage of the vehicle control system. In some implementations, the invention implements a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The invention may also be embodied in other control systems 440 of vehicle 430. Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices for example hard disk drives HDD and/or DVDs. At least one HDD may have the configuration shown in FIG. 6 and/or at least one DVD may have the configuration shown in FIG. 7. The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448. The control system 440 may also include mass data storage, memory and/or a WLAN interface (all not shown).

Figure 10:
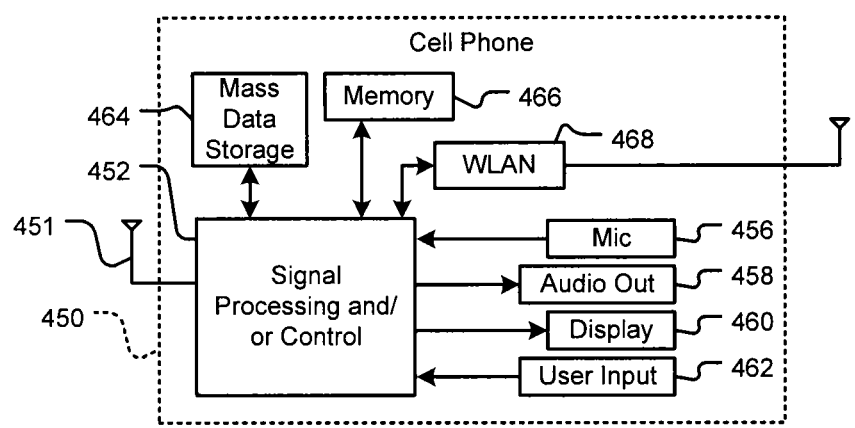

Referring now to FIG. 10, the invention may be embodied in a cellular phone 450 that may include a cellular antenna 451. The invention may implement either or both signal processing and/or control circuits, which are generally identified in FIG. 10 at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. At least one HDD may have the configuration shown in FIG. 6 and/or at least one DVD may have the configuration shown in FIG. 7. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 11:
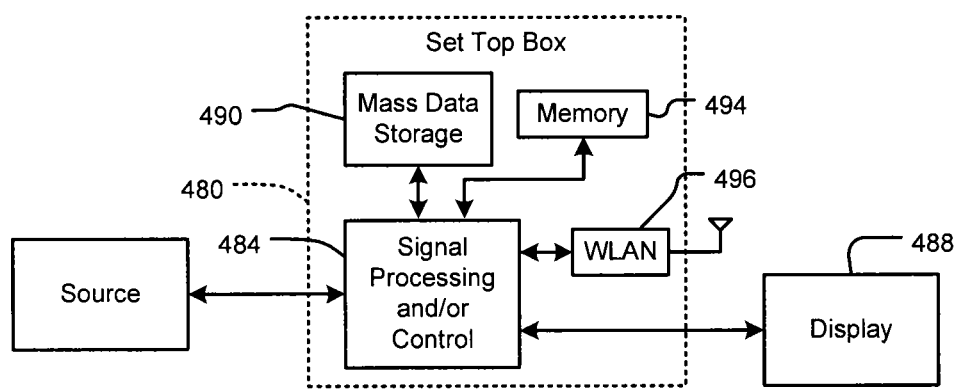

Referring now to FIG. 11, the invention may be embodied in a set top box 480. The invention may implement either or both signal processing and/or control circuits, which are generally identified in FIG. 11 at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices for example hard disk drives HDD and/or DVDs. At least one HDD may have the configuration shown in FIG. 6 and/or at least one DVD may have the configuration shown in FIG. 7. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496.

Figure 12:
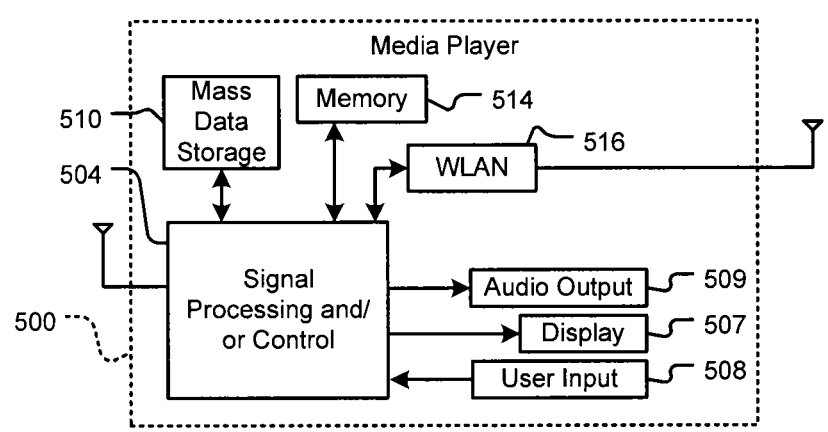

Referring now to FIG. 12, the invention may be embodied in a media player 500. The invention may implement either or both signal processing and/or control circuits, which are generally identified in FIG. 12 at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 6 and/or at least one DVD may have the configuration shown in FIG. 7. The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via a WLAN network interface 516. Still other implementations in addition to those described above are contemplated.

Figure 13:
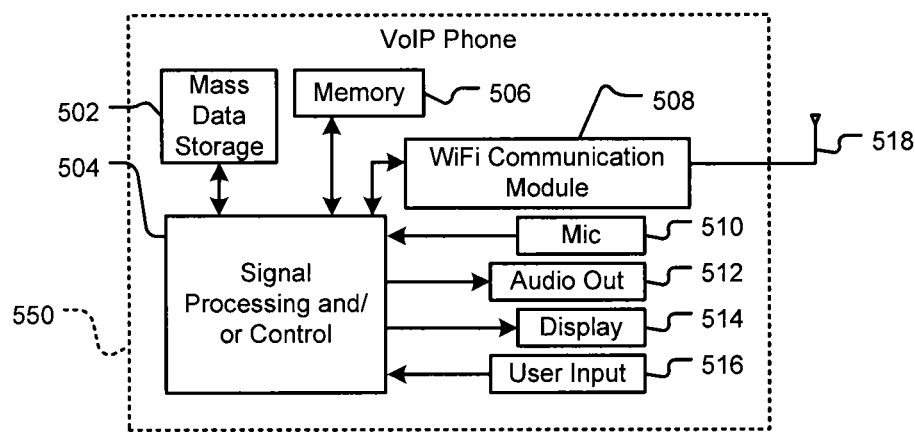

Referring to FIG. 13, the invention may be embodied in a Voice over Internet Protocol (VoIP) phone 550 that may include an antenna 518. The invention may implement either or both signal processing and/or control circuits, which are generally identified in FIG. 13 at 504, a wireless interface and/or mass data storage of the VoIP phone 550. In some implementations, VoIP phone 550 includes, in part, a microphone 510, an audio output 512 such as a speaker and/or audio output jack, a display monitor 514, an input device 516 such as a keypad, pointing device, voice actuation and/or other input devices, and a Wireless Fidelity (Wi-Fi) communication module 508. Signal processing and/or control circuits 504 and/or other circuits (not shown) in VoIP phone 550 may process data, perform coding and/or encryption, perform calculations, format data and/or perform other VoIP phone functions.

VoIP phone 550 may communicate with mass data storage 502 that stores data in a nonvolatile manner such as optical and/or magnetic storage devices, for example hard disk drives HDD and/or DVDs. At least one HDD may have the configuration shown in FIG. 6 and/or at least one DVD may have the configuration shown in FIG. 7. The HDD may be a mini HDD that includes one or more platters having a diameter that is smaller than approximately 1.8". VoIP phone 550 may be connected to memory 506, which may be a RAM, ROM, low latency nonvolatile memory such as flash memory and/or other suitable electronic data storage. VoIP phone 550 is configured to establish communications link with a VoIP network (not shown) via Wi-Fi communication module 508.

In accordance with various embodiments of the invention, the methods described herein are intended for operation with dedicated hardware implementations including, but not limited to, semiconductors, application specific integrated circuits, programmable logic arrays, and other hardware devices constructed to implement the methods and modules described herein. Moreover, various embodiments of the invention described herein are intended for operation with as software programs running on a computer processor. Furthermore, alternative software implementations including, but not limited to, distributed processing or component/object distributed processing, parallel processing, virtual machine processing, any future enhancements, or any future protocol can also be used to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed:

1. A circuit for a storage device having a storage medium, the circuit comprising:
    a detector configured to detect a frequency offset based on a first distance between sync codes associated with the storage medium and generate an output, the detector further configured to generate an error signal based on a second distance, the second distance generated based on a frequency of the sync codes and to subtract the first distance from the second distance to generate a code distance difference and generate a normalized sync code distance difference; and
    a control circuit configured to adjust a frequency of a clock based on the output of the detector to synchronize the frequency with a signal read from the storage medium.

2. The circuit according to claim 1, wherein the detector is programmable based upon a format of the sync codes.

3. The circuit according to claim 1, wherein the code distance difference is a number of clock cycles between occurrences of repetitions of the sync codes.

4. The circuit according to claim 1, wherein the first distance is programmable.

5. The circuit according to claim 1, wherein the code distance difference is divided by the first distance and wherein the normalized sync code distance difference is the error signal.

6. The circuit according to claim 1, wherein the detector is further configured to compare the code distance difference with a threshold value, generate another output, transmit the normalized sync code distance difference to a timing loop based on the other output.

7. The circuit according to claim 6, further comprising:
an absolute value module configured to receive the normalized sync code distance difference and generate an absolute value of the normalized sync code distance difference.

8. The circuit according to claim 1, wherein the detector is further configured to compare the normalized sync code distance difference with a threshold value, generate another output, and transmit the normalized sync code distance difference to a timing loop based on the other output.

9. The circuit according to claim 8, wherein the threshold value is programmable.

10. A method for a storage device having a storage medium, the method comprising:
detecting a frequency offset by a detector based on a first distance between sync codes associated with the storage medium, wherein the detector generates an error signal based on a second distance, the second distance generated based on a frequency of the sync codes;
subtracting the first distance from the second distance to generate a code distance difference; and
generating a normalized sync code distance difference; and
adjusting a frequency of a clock by a control circuit based on an output of the detector to synchronize the frequency with a signal read from the storage medium.

11. The method according to claim 10, further comprising:
programming the detector based upon a format of the sync codes.

12. The method according to claim 10, further comprising:
counting a number of clock cycles between occurrences of repetitions of the sync codes as the code distance difference.

13. The method according to claim 10, further comprising:
programming the first distance.

14. The method according to claim 10, further comprising:
dividing the code distance difference by the first distance; and
generating the normalized sync code distance difference as the error signal.

15. The method according to claim 10, further comprising:
comparing the code distance difference with a threshold value to generate art another output; and
transmitting the normalized sync code distance difference to a timing loop based on the other output.

16. The method according to claim 15, further comprising:
receiving the normalized sync code distance difference; and
generating an absolute value of the normalized sync code distance difference.

17. The method according to claim 10, further comprising:
comparing the normalized sync code distance difference with a threshold value to generate another output; and
transmitting the normalized sync code distance difference to a timing loop based on the other output.

18. The method according to claim 17, further comprising:
programming the threshold value.

* * * * *